United States Patent [19]

Kumagai et al.

[11] Patent Number: 4,960,040

[45] Date of Patent: Oct. 2, 1990

[54] ARM STRUCTURE FOR ARTICULATED MECHANISM

[75] Inventors: Tomoharu Kumagai, Tokyo; Masato Hirose, Saitama; Masao Nishikawa, Tokyo, all of Japan

[73] Assignee: Honda Giken Kogyo Kabushiki Kaisha, Tokyo, Japan

[21] Appl. No.: 290,246

[22] Filed: Dec. 23, 1988

[30] Foreign Application Priority Data

Dec. 30, 1987 [JP] Japan ................. 62-332727

[51] Int. Cl.⁵ ................ F02F 7/00; B25J 11/00
[52] U.S. Cl. ........................ 92/261; 901/22; 901/28; 138/28; 138/30
[58] Field of Search .......... 60/415; 901/22, 27, 901/28; 138/26, 27, 28, 30; 92/66, 67, 118, 119, 261

[56] References Cited

U.S. PATENT DOCUMENTS 4,561,816 12/1985 Dingess .
4,784,042 11/1988 Paynter ..................... 901/22

FOREIGN PATENT DOCUMENTS

| 068770 | 6/1982 | European Pat. Off. . | |
| 3500410 | 2/1985 | Fed. Rep. of Germany . | |
| 3615177 | 2/1987 | Fed. Rep. of Germany | 138/30 |
| 2378612 | 9/1978 | France | 901/22 |
| 0086901 | 7/1980 | Japan | 138/30 |
| 1085802 | 4/1984 | U.S.S.R. | 901/22 |
| 1187980 | 10/1985 | U.S.S.R. | 901/22 |
| 1294517 | 3/1987 | U.S.S.R. | 901/22 |
| 1414618 | 8/1988 | U.S.S.R. | 901/22 |
| 120218 | 11/1918 | United Kingdom | 138/28 |
| 2097754 | 5/1982 | United Kingdom . | |
| 2169031 | 11/1984 | United Kingdom . | |

OTHER PUBLICATIONS

Patent Abstracts of Japanese Applications (English), Dec. 1988.

Primary Examiner—Edward K. Look
Assistant Examiner—Thomas Denion
Attorney, Agent, or Firm—Lyon & Lyon

[57] ABSTRACT

An arm structure for use in an articulated mechanism such as an industrial robot comprises a plurality of links operatively interconnected by articulations having respective actuators and actuatable by the actuators under a fluid pressure. Each of the links comprises a hollow cylindrical casing and an accumulator comprising a pipe extending axially through the casing and a rubber tube disposed around the pipe. The tube is radially inflatable by the pressure of the fluid supplied into the space between the pipe and the tube through small holes defined in the wall of the pipe.

17 Claims, 2 Drawing Sheets

ARM STRUCTURE FOR ARTICULATED MECHANISM

BACKGROUND OF THE INVENTION

1. Field of the Invention

The present invention relates to an arm structure for an articulated mechanism, and more particularly to such a mechanism having a plurality of articulated links comprising accumulators.

2. Description of the Prior Art

There have recently been proposed various articulated mechanisms, such as industrial robots or the like, which comprise articulations actuatable under hydraulic pressure. One example of such an articulated mechanism is disclosed in Japanese Laid-Open Patent Publication No. 52-69152.

Many hydraulically operated articulated mechanisms employ an accumulator with a view to reducing the capacity of a hydraulic pressure source used for supplying a hydraulic pressure to the articulated mechanism. Since the accumulator is in the form of a heavy high-pressure container, it cannot be installed in a movable member such as an articulated arm of the mechanism, but has to be mounted on an immovable member. The articulated mechanism also includes many hydraulic motors associated with the respective articulations for actuating the articulated arms and directional control valves for controlling the hydraulic motors. If only one accumulator is used, those hydraulic motors which are located remotely from the accumulator may not be operated smoothly since a certain time delay is inevitable in receiving the hydraulic pressure from the accumulator. It has been impossible to provide accumulators to be combined respectively with the hydraulic motors because of the large weight of the accumulators.

Where the articulations are connected in series with each other, oil passages are required to deliver high-pressure working oil from the common hydraulic pressure source successively to the motors which are sequentially arranged from the proximal end of the articulations and also to deliver the working oil back to a tank. Since these oil passages are normally arranged along the articulated arms, they take up a large space and so does the accumulator. Consequently, the entire articulated mechanism is large in size.

SUMMARY OF THE INVENTION

It is an object of the present invention to provide an arm structure for an articulated mechanism having movable parts, such as a working robot, the arm structure being constructed to incorporate accumulators therein.

Another object of the present invention is to provide an arm structure for an articulated mechanism, including accumulators disposed respectively near articulations of the articulated mechanism for supplying a fluid pressure to respective actuators without a delay to ensure smooth operation.

Still another object of the present invention is to provide an arm structure for an articulated mechanism, including accumulators which do not present an obstacle to two oil passages or pipes that extend commonly through links and articulations of the articulated mechanism.

According to the present invention, an articulated mechanism includes a plurality of links operatively interconnected by articulations having respective actuators and actuatable by the actuators under a fluid pressure, each of the links comprising an accumulator.

Since the links incorporate accumulators respectively therein, the actuators of the respective articulations can receive an assistive fluid pressure energy without a delay. The links doubling as accumulators are not increased in weight and allow fluid passages to coexist well therewith.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
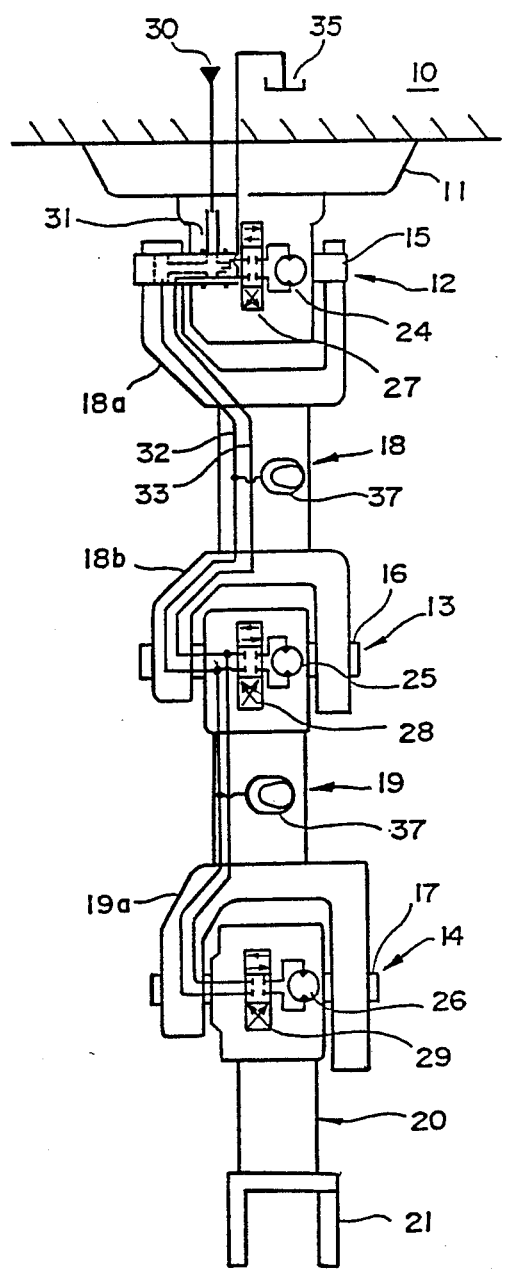
FIG. 1 is a schematic view of an arm structure for an articulated mechanism according to the present invention.

FIG. 1 shows an arm structure for an articulated mechanism such as a working robot in accordance with the present invention.

The arm structure is suspended from a base 11 mounted on a ceiling 10 of a factory, for example. The arm structure comprises three articulations 12, 13, 14 and three links 18, 19, 20 angularly movably coupled to the articulations 12, 13, 14, respectively, through respecitve shafts 15, 16, 17. A hand 21 is mounted on the third link 20 which is positioned on the distal end of the arm structure. The first link 18 has yokes 18a, 18b on its opposite ends, the yoke 18a being coupled to the shaft 15, and the yoke 18b being coupled to the second link 19 through the second shaft 16 in the second articulation 13. The second link 19 has a yoke 19a on its lower end which is coupled to the third link 20 through the third shaft 17 in the third articulation 14. The articulations 12, 13, 14 have respective angular displacement fluid motors 24, 25, 26 disposed therein and connected to the shafts 15, 16, 17, and respective four-way directional control valves 27, 28, 29 disposed therein and connected to the respective fluid motors 24, 25, 26 in a fluid transmitting relationship. The links 18, 19, 20 can therefore be angularly displaced relatively to each other by the fluid motors 24, 25, 26 through the respective shafts 15, 16, 17.

The fluid motors 24, 25, 26 which are connected in series with each other are supplied with a fluid under pressure, e.g., oil under pressure, from an oil pressure source 30 through the respective directional control valves 27, 28, 29. More specifically, the oil under pressure from the oil pressure source 30 is supplied to the first fluid motor 24 through an oil passage defined in a swivel bearing mechanism 31 in which the shaft 15 is rotatably supported, and also through an oil passage defined in the shaft 15 and the directional control valve 27. The swivel bearing mechanism 31 is mounted on the base 11. The oil under pressure is also supplied from an axial end of the oil passage in the shaft 15 through a higher-pressure oil supply passage 32 extending longitudinally in the first link 18 into the second articulation 13. In the second articulation 13, the oil under pressure is supplied through a swivel bearing mechanism (not shown) to the second fluid motor 25 via the second directional control valve 28. The oil under pressure is also supplied through the oil supply passage 32 extending through the second link 19 into the third articulation 14 in which the oil is supplied to the third fluid motor 26 via the third directional control valve 29. The oil discharged from the third fluid motor 26 returns to a tank 35 through a lower-pressure oil return passage 33 extending through the first and second links 18, 19 parallel to the oil supply passage 32. The oil supply and return passages 32, 33 comprise pipes extending through the links 18, 19. The oil supply passage 32 in each of the links 18, 19 is combined with an accumulator 37 disposed in the link, as described below.

Figure 2:
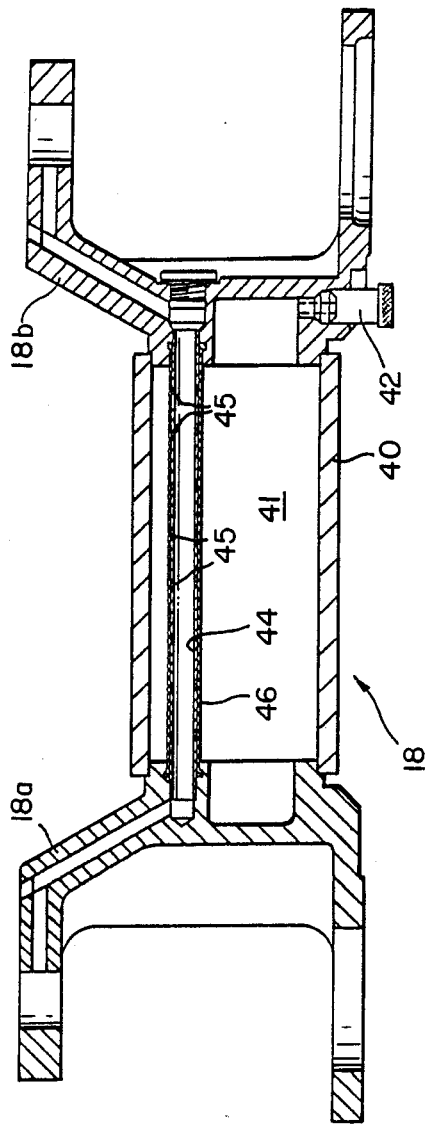
FIG. 2 is a cross-sectional view of a link of the arm structure, the link incorporating an accumulator therein.
Figure 3:
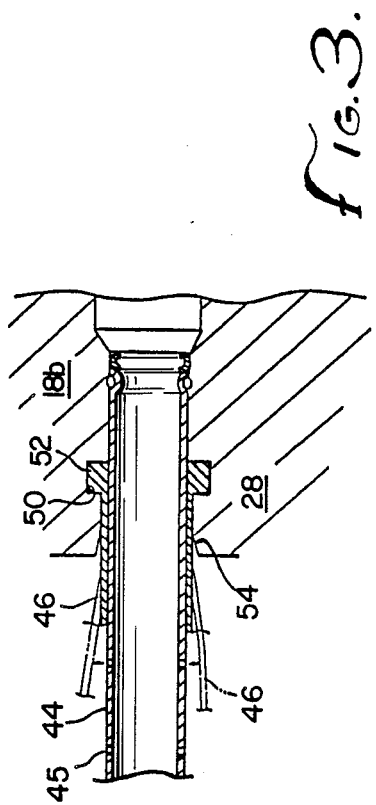
FIG. 3 is an enlarged fragmentary cross-sectional view of the link.

The accumulator 37 is shown in detail in FIGS. 2 and 3. FIG. 2 shows the first link 18 at an enlarged scale. Although not shown, the second link 19 is structurally substantially the same as the first link 18. The first link 18 comprises a cylindrical casing 40 to which the yokes 18a, 18b are hermetically coupled. The casing 40 has an inner space 41 which is filled with a gas under high pressure through a filling valve 42 mounted in the yoke 18b. The casing 40 and the yokes 18a, 18b are made of a metal such as aluminum, and are joined to each other by an electron beam welding process in the illustrated embodiment. The higher-pressure oil supply passage 32 comprises a pipe 44 extending axially through the gas-filled inner space 41 between the yokes 18a, 18b and connected to oil passages defined in the yokes 18a, 18b. The higher-pressure working fluid, i.e. oil, flows through the pipe 44 toward the second directional control valve 28 in the second articulation 13.

The pipe 44 is covered with a tube 46 of rubber which is radially expandable and contractable. As illustrated in FIG. 3, the tube 46 has a radially outwardly thickened end 52 inserted in an annular pocket 50 defined in the yoke 18b so that the pipe 44 is firmly connected to the yoke 18b. The other end of the tube 46 is structured and joined to the yoke 18a in the same manner, as can be seen from FIG. 2. The pipe 44 has a number of small holes 45 defined through its wall at spaced intervals. Therefore, the oil flowing under pressure through the pipe 44 can flow out of the pipe 44 through the holes 45 into the space between the pipe 44 and the tube 46. The rubber tube 46 is held in contact with the oil under pressure on the inner surface thereof and with the high-pressure gas on the outer surface thereof. Therefore, when the oil of a pressure higher than the pressure of the gas enters the space between the pipe 44 and the tube 46, the tube 46 expands outwardly as indicated by the arrows and the imaginary lines in FIG. 3 to store the introduced oil pressure against the gas pressure acting on the outer surface of the tube 46. Therefore, tube 46 around the pipe 44 serves as an accumulator. The yoke 18b has a slightly tapered or curved surface 54 around the portion of the tube 46 which is inserted in the yoke 18b, for preventing the tube 46 from being damaged by contact with the yoke 18b when the tube 46 is inflated.

Where the gas is initially filled in the inner space 41 under a pressure of 70 kb/cm$^2$, for example, when the oil flowing into the pipe 44 has a pressure higher than the gas pressure, the tube 46 is expanded radially outwardly to store the supplied oil pressure. The accumulator thus constructed is effective to meet an abrupt pressure energy consumption by the articulations 12, 13 on the opposite ends of the link 18. When the stored pressure energy in the accumulator 37 in the first link 18 is insufficient, a necessary stored pressure energy may be supplied from the accumulator 37 in the adjacent second link 19.

Since the casing 40 serves as a high-pressure gas container, its wall is required to have a relatively large wall thickness to provide a certain degree of pressure resistance. However, the weight of the casing 40 is much smaller than it would be if an independent accumulator were provided as is the case with the conventional articulated mechanisms. The casing 40 is also relatively small in size since the accumulator is incorporated therein and does not take up a large space. Another advantage is that the pipe 44 of the accumulator serves as the oil supply passage for supplying oil to the next articulation, and hence no special space is required for installing another oil supply pipe outside of the casing 40.

While a pipe defining the oil return passage 33 is not shown in FIG. 2, it may be disposed in the casing 40 parallel to the pipe 44. The yokes 18a, 18b and the casing 40 may be made of a high polymeric composite material such as CFRP or the like other than metal, and may be joined to each other by brazing rather than electron beam welding. In the illustrated embodiment, oil under pressure is employed as a working fluid. However, another fluid such as air under pressure may be used as a working fluid, in which case no return passage is required.

The accumulator 37 of the above construction is more advantageous as the articulated mechanism is hydraulically actuated and the arm structure is longer and more complex. The accumulator 37 is not limited to use with a motor for actuating an articulation, but may be used in various applications. For example, it may be used with hydraulically actuated end effector such as the hand 21 on the distal end of the arm structure illustrated in FIG. 1 by being incorporated in the third link 20.

Although a certain preferred embodiment has been shown and described, it should be understood that many changes and modifications may be made therein without departing from the scope of the appended claims.

What is claimed is:

1. An arm structure for an articulated mechanism, comprising a plurality of links operatively interconnected by articulations actuatable under a fluid pressure, each of said links comprising an accumulator for the fluid pressure.

2. An arm structure according to claim 1, wherein each of said links is of a hermetically sealed hollow structure filled with a gas under pressure, said accumulator including a fluid passage disposed in said each link for transferring said fluid under pressure, said fluid passage being expandable and contractable dependent on the pressure of said fluid supplied thereto.

3. An arm structure according to claim 2, wherein said fluid passage comprises a pipe extending through said links for transferring said fluid under pressure therethrough, and an expandable and contractable tube surrounding said pipe, said pipe having a plurality of holes defined therein for allowing said fluid under pressure to enter from said pipe into a space defined between said pipe and said tube.

4. An arm structure according to claim 3, wherein each of said links comprises a hollow cylindrical casing filled with said gas under pressure and at least one yoke on one end thereof, said expandable and contractable tube being made of rubber and having a radially outwardly thickened end retained in a pocket defined in said yoke.

5. An arm structure according to claim 4, wherein said expandable and contractable tube extends axially through said cylindrical casing.

6. An articulated robotic arm comprising
a first accumulator comprising a first hollow cylindrical casing fillable with a gas under pressure and also comprising a first pipe extending through said first hollow cylindrical casing, said first pipe having a first aperture, said first accumulator further comprising a first tube which is expandable and contractable and surrounds said first pipe, said first aperture allowing a pressurized fluid in said first pipe to enter from said first pipe into a first space defined between said first pipe and said first tube;
a first link comprising said first accumulator;
a second accumulator comprising a second hollow cylindrical casing fillable with a gas under pressure and also comprising a second pipe extending through said second hollow cylindrical casing, said second pipe having a second aperture, said second accumulator further comprising a second tube which is expandable and contractible and surrounds said second pipe, said second aperture allowing a pressurized fluid in said second pipe to enter from said second pipe into a second space defined between said second pipe and said second tube; and
a second link comprising said second accumulator, said second link being operatively coupled to said first link.

7. The robotic arm of claim 6 further comprising actuating means for effecting relative angular displacement of said first and second links independent of each other.

8. The robotic arm of claim 7 wherein said actuating means comprises
a first control means for controlling fluid pressure in said first pipe; and
a second control means for controlling fluid pressure in said second pipe, wherein said first and second control means are capable of operation independent of each other.

9. The robotic arm of claim 8 wherein
said first control means comprises a first angular displacement fluid motor; and
said second control means comprises a second angular displacement fluid motor.

10. The robotic arm of claim 9 wherein
said first control means further comprises a first directional control valve connected to said first angular displacement fluid motor in a fluid transmitting relationship; and
said second control means further comprises a second directional control valve connected to said second angular displacement fluid motor in a fluid transmitting relationship.

11. The robotic arm of claim 6 wherein a pressure energy in one of said first and second accumulators can be accumulated independently of the other of said first and second accumulators.

12. The robotic arm of claim 6 wherein a pressure energy in one of said first and second accumulators can be supplied to the other of said first and second accumulators.

13. The robotic arm of claim 12 further comprising a fluid supply passage extending between said first and second accumulators.

14. The robotic arm of claim 13 further comprising a valve in said fluid supply passage, whereby a pressure energy in one of said first and second accumulators can be optionally accumulated separately from a pressure energy in the other of said first and second accumulators and alternatively supplied to the other of said first and second accumulators.

15. The robotic arm of claim 6 wherein said second link is arranged to receive all of its pressurized fluid through said first pipe.

16. The robotic arm of claim 6 wherein said first accumulator is integrally disposed within said first link, and said second accumulator is integrally disposed within said second link.

17. A method of controlling an articulated robotic arm comprising the steps of independently accumulating and applying pressure energy in separate links between articulations, whereby said links are angularly displaced relatively to each other.

* * * * *